Patented Apr. 9, 1940

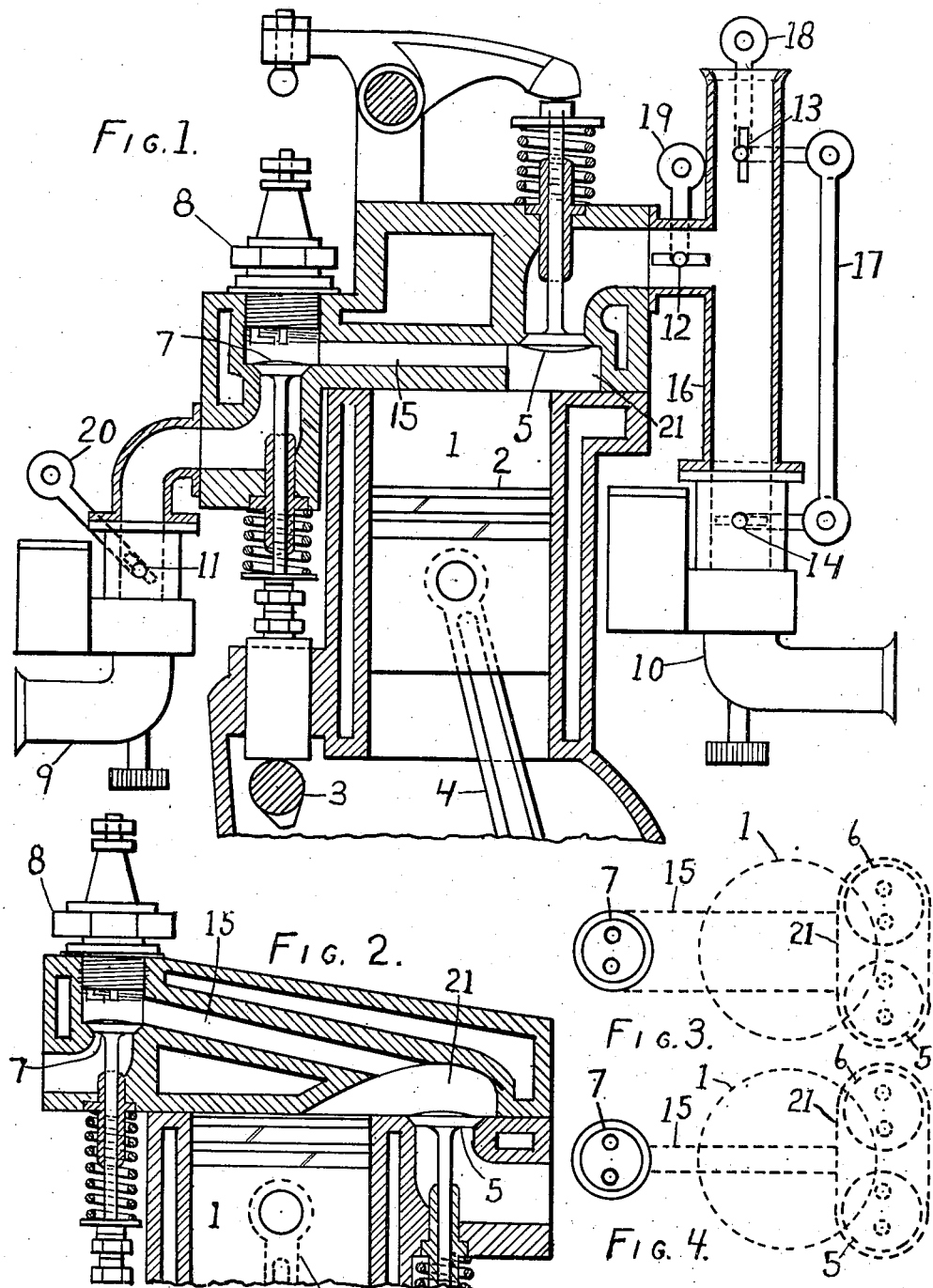

2,196,860

UNITED STATES PATENT OFFICE 2,196,860

INTERNAL COMBUSTION ENGINE

Clarence C. Groth, New York, N. Y.

Application February 8, 1938, Serial No. 189,346

11 Claims. (Cl. 123—75)

My invention relates to improvements in engines of the spark ignition type, and provides an elongated ignition chamber extending over the cylinder bore. One end of the ignition chamber is provided with an inlet valve and a spark plug and the other end of the ignition chamber has constant communication with the combustion chamber.

This invention is adaptable to engines of any size, number or arrangement of cylinders and is adaptable to air cooled and liquid cooled engines.

My invention provides a rich and easily ignited fuel mixture around the spark plug regardless of the speed or power output of the engine and enables the engine to take into the cylinder more air in proportion to fuel and insures proper igniting of the fuel because of the spark plug being located in the portion of the ignition chamber where the rich mixture is compressed.

Engines with ignition chambers have not been successful before because of the mixing of the two charges in the ignition chamber around the spark plug. Heretofore ignition chamber engines have not had the spark plug located far enough from the main part of the combustion chamber together with too much turbulence of the gases before ignition. In my engine the elongated ignition chamber prevents a mixing of the gases at the spark plug by the remoteness of the spark plug from the main combustion chamber space, also the attenuated shape of the ignition chamber prevents turbulence and its resultant mixing of the gases. In my engine, by the extending of the elongated ignition chamber over the cylinder bore, a compact engine construction is attained together with the advantages of this ignition chamber. The elongated ignition chamber with the inlet valve and the spark plug in its inlet end, assures a fresh charge around the spark plug because the incoming fresh charge drives the burned residue from the elongated chamber and the fresh charge takes its place, which assures regular firing. The explosion blast from the ignition chamber creates a turbulence in the combustion chamber which thoroughly mixes the contents assuring rapid and complete combustion.

When adapted to the valve-in-head type engine, a single cam shaft can operate the ignition chamber valves and the conventional engine valves. When adapted to a side valve engine, a camshaft can be provided on one side of the engine cylinders for the conventional inlet and exhaust valves and another camshaft on the other side of the engine cylinders for the ignition chamber valves. Simplicity of valve gear in either case is made possible by the construction of the elongated ignition chamber as pointed out in this invention.

The fuel mixture entering the combustion chamber through the regular inlet valve may be a heavy fuel or one of poor quality or air alone may be admitted to the cylinder through this valve, but in any case sufficient air can be permitted to enter the combustion chamber to insure complete combustion of the fuel which enters. Ignition and combustion is assured because of the rich and easily ignited mixture which is compressed in the intake end of the elongated ignition chamber where the spark plug is located.

Because this invention causes the fuel to be burned more completely in the engine a smaller quantity of poisonous gases are contained in the exhaust. This lessens the danger of asphyxiation and is an important health feature.

An object of this invention is to increase the efficiency of an engine by using a greater proportion of air to fuel thus providing sufficient oxygen to produce complete combustion of the fuel.

Another object of this invention is to provide a rich enough mixture at the spark plug to produce ignition of the charge regardless of the quality of the charge in the rest of the combustion chamber.

Another object of this invention is to increase the efficiency of an engine by enabling the engine to use higher compression particularly at reduced speeds and power requirements.

Another object of this invention is the creating of turbulence in the combustion chamber by the explosion blast from the ignition chamber which assures rapid and complete combustion.

Another object of this invention is a compact engine with simple valve gear in combination with the elongated ignition chamber.

Another object of this invention is suitable fuel and air induction means in an engine in combination with the elongated ignition chamber.

The constructions shown in the drawing are simple means of carrying out the broad idea of this invention.

I attain the above objects and others by the constructions illustrated in the accompanying drawing in which—

Fig. 1 is a vertical section of one cylinder of an engine of the valve-in-head type. Fig. 2 is a vertical section of a portion of one cylinder of an engine of the side valve type. Fig. 3 is a diagram showing one shape of ignition chamber and relation of parts of Fig. 1 as viewed from the top. Fig. 4 is a diagram showing another shape of ignition chamber and relation of parts of Fig. 1 as viewed from the top.

Throughout the several views similar numerals refer to similar parts.

Numeral 1 represents the cylinder; 2 is the piston; 3 is the camshaft for operating the ignition chamber valves; 4 is the connecting rod; 5 is the conventional inlet valve; 6 is the exhaust valve; 7 is the ignition chamber inlet valve; 8 is the spark plug; 9 is the carburetor for mixing the charge for the ignition chamber; 10 is the carburetor for mixing the charge for entrance into the combustion chamber through valve 5; 11 is the valve for regulating the quantity of charge which enters the ignition chamber through valve 7; 12 is the valve for regulating the quantity of fuel mixture or air which enters the combustion chamber through valve 5; 13 is the valve for regulating the quantity of air which enters the combustion chamber through valve 5 without passing through carburetor 10; 14 is the valve for regulating the quantity of fuel which enters the combustion chamber through valve 5; 15 is the elongated ignition chamber; 16 is the induction pipe for conveying fuel mixture from carburetor 10 and air which passes valve 13 for entrance into the combustion chamber through valve 5; 17 is the connecting rod for causing valve 13 and valve 14 to operate simultaneously, one valve closes as the other opens; 18 is the lever for operating valve 13 and valve 14; 19 is the lever for operating valve 12; 20 is the lever for operating valve 11; 21 is the combustion chamber.

As the piston 2 descends on the suction stroke, a rich fuel mixture is drawn into the ignition chamber 15 through valve 7 and at the same time either air or fuel mixture or a combination of both is drawn into combustion chamber 21 and cylinder 1 through valve 5. The quality of the charge is regulated by valves 13 and 14 and the quantity is regulated by valve 12. On the compression stroke, piston 2 compresses the contents of cylinder 1, combustion chamber 21 and ignition chamber 15 into combustion chamber 21 and ignition chamber 15, but as this invention's elongated ignition chamber 15 contains only rich mixture from the carburetor 9, only rich mixture will be compressed at the ignition chamber's end containing the spark plug, even if valves 13 and 14 are set so that only air enters through valve 5. The speed and power output of the engine can be increased either by opening further valve 11 or by regulating lever 18 operating valves 13 and 14 to permit more fuel and a lesser quantity of air to enter the combustion chamber through valve 5. For the power stroke the rich fuel mixture in the end of ignition chamber 15 is ignited by the spark plug 8. The resulting flame entering combustion chamber 21 plus the increased pressure will ignite the charge in combustion chamber 21 or if the valves 12, 13 and 14 are set so that air only is in the combustion chamber the rich mixture will be burned more completely thus giving more power with less fuel on the power stroke. The engine exhausts on the next stroke through the conventional exhaust valve 6.

I claim:

1. In an internal combustion engine in combination, an engine cylinder having a main valve chamber, an inlet valve for the main valve chamber, an exhaust valve for said cylinder, an ignition chamber extending across the periphery of said cylinder at its combustion end and having communication with the interior of the cylinder through said main valve chamber, a valve for supplying fuel to the ignition chamber, and ignition means in said ignition chamber.

2. In an internal combustion engine combination, an engine cylinder, a piston in said cylinder, a cylinder head formed to provide restricted clearance for a portion of said piston, a main combustion chamber in said cylinder head formed to provide a combustion space having greater clearance for a portion of said piston than the clearance heretofore mentioned, an inlet valve for said main combustion chamber, an exhaust valve for said main combustion chamber, an ignition chamber extending across the cylinder's bore periphery at the combustion end of the cylinder and having communication with the main combustion chamber, a fuel supply valve for said ignition chamber, and ignition means in said ignition chamber.

3. In an internal combustion engine in combination, an engine cylinder having a main valve chamber, an inlet valve for said main valve chamber, an exhaust valve for said main valve chamber, an ignition chamber extending across the periphery of said cylinder at its combustion end and having communication with said main valve chamber, a fuel inlet valve for said ignition chamber, ignition means for said ignition chamber, a fluid inlet conduit for said main valve chamber, and a fluid inlet conduit for said ignition chamber located at the opposite side of said cylinder from the fluid inlet conduit for the said main valve chamber.

4. In an internal combustion engine in combination, an engine cylinder having a main valve chamber, an inlet valve for said main valve chamber, an exhaust valve for said main valve chamber, an ignition chamber extending across the periphery of said cylinder at its combustion end, ignition means in said ignition chamber, an inlet valve having a valve stem for said ignition chamber, and means extending along the side of said cylinder and in direct line with said valve stem for actuating said inlet valve in said ignition chamber.

5. In an internal combustion engine in combination, an engine cylinder having a main valve chamber, an inlet valve for the main valve chamber, an exhaust valve for said cylinder, an ignition chamber extending across the periphery of said cylinder at its combustion end and having communication with the interior of the cylinder through said main valve chamber, a valve for supplying fuel to the ignition chamber, ignition means in said ignition chamber, means for supplying air to said main valve chamber, and means for supplying a combustible charge to said ignition chamber.

6. In an internal combustion engine, in combination, an engine cylinder having a main valve chamber, an inlet valve for the main valve chamber, an exhaust valve for said cylinder, an ignition chamber extending across the periphery of said cylinder at its combustion end and having communication with the cylinder, ignition means in said ignition chamber, a separate valve for admitting fuel to the ignition chamber, means independent of said first mentioned valve for operating the fuel inlet valve of the ignition chamber, separate means for supplying charges of fuel to the inlet valves of the main valve chamber and the ignition chamber, and means for varying the quality of the charge of fuel supplied to the inlet valve of the main valve chamber.

7. In an internal combustion engine in combination, an engine cylinder having a main valve chamber, an exhaust valve for said main valve chamber, an ignition chamber, ignition means in said ignition chamber, a fuel inlet valve for admitting fuel to said ignition chamber, a cam for operating the inlet valve of the ignition chamber, an inlet valve independent of said cam for said main valve chamber, separate means for suplying charges of fuel to the inlet valves of the main valve chamber and the ignition chamber, and means for controlling both the volume and character of the charge admitted to the fuel intake valve of the main valve chamber.

8. In an internal combustion engine in combination, an engine cylinder, a piston in said cylinder, a cylinder head formed to provide restricted clearance for a portion of said piston, a valve chamber in said cylinder head formed to provide greater clearance for a portion of said piston than the clearance heretofore mentioned, an inlet valve for said valve chamber, an exhaust valve for said valve chamber, an ignition chamber having communication with the valve chamber, a fuel supply valve for said ignition chamber, ignition means in said ignition chamber, separate and independent means for supplying fuel charges to the inlet valves of the combustion chamber and the ignition chamber, means for varying both the character and volume of the charge admitted to the main valve chamber, and means for controlling the volume of the charge admitted to the intake valve of the ignition chamber.

9. In an internal combustion engine in combination, an engine cylinder having a main valve chamber, an inlet valve for said main valve chamber, an exhaust valve for said main valve chamber, an ignition chamber extending across the periphery of said cylinder at its combustion end and having communication with said main valve chamber, a fuel inlet valve for said ignition chamber, ignition means for said ignition chamber, a fluid inlet conduit for said main valve chamber, a fluid inlet conduit for said ignition chamber located at the opposite side of said cylinder from the fluid inlet conduit for the said main valve chamber, means for supplying air to said main valve chamber, means for supplying a combustible charge to said main valve chamber, and separate independent means for supplying a combustible charge to said ignition chamber.

10. In an internal combustion engine in combination, an engine cylinder having a main valve chamber, an inlet valve for said main valve chamber, an exhaust valve for said main valve chamber, an ignition chamber extending across the periphery of said cylinder at its combustion end, ignition means in said ignition chamber, an inlet valve having a valve stem for said ignition chamber, means extending along the side of said cylinder and in direct line with said valve stem for actuating said inlet valve in said ignition chamber, means for supplying air to said main valve chamber, means for supplying a combustible charge to said ignition chamber, and means for controlling the volume of the combustible charge delivered to the ignition chamber.

11. In an internal combustion engine in combination, an engine cylinder, an ignition chamber extending across the cylinder bore's periphery at the combustion end of the cylinder, ignition means in said ignition chamber, an inlet valve for said ignition chamber, cam actuated means for operating the ignition chamber's inlet valve, and a main inlet valve independent of said cam actuated means for the cylinder.

CLARENCE C. GROTH.